June 5, 1962  H. G. COOPER  3,037,798
HOSE AND MANUFACTURING METHOD
Filed March 12, 1959
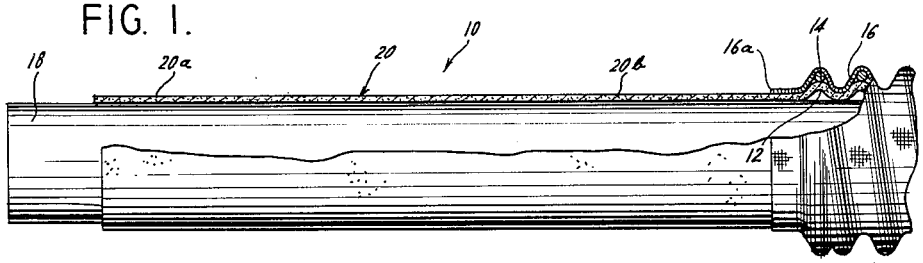
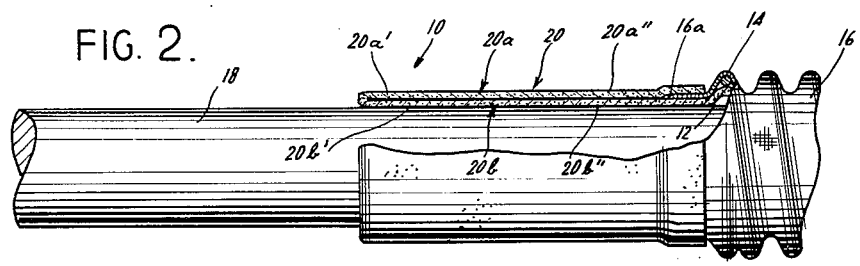
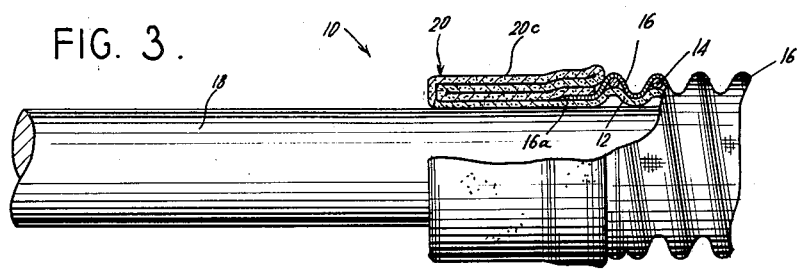
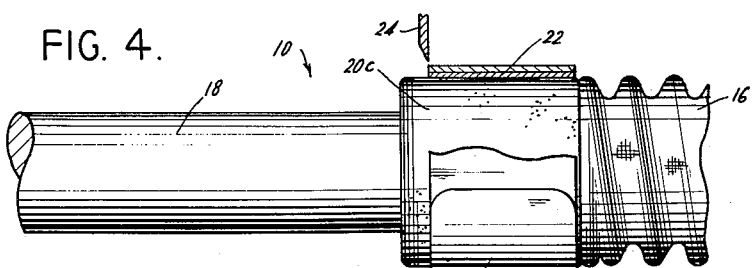
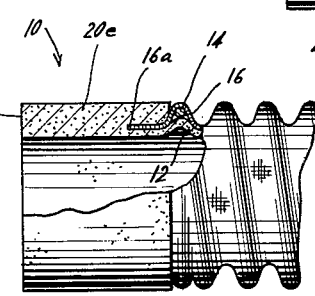
INVENTOR.
HOWARD G. COOPER

United States Patent Office 3,037,798
Patented June 5, 1962

3,037,798
HOSE AND MANUFACTURING METHOD
Howard G. Cooper, Genesee, Pa., assignor to Herbert
Cooper Co., Inc., Genesee, Pa.
Filed Mar. 12, 1959, Ser. No. 799,031
6 Claims. (Cl. 285—239)

The present invention relates generally to a hose and a method of manufacturing hoses, and in particular to a hose having a thick-walled fitting and a method of forming such a fitting thereon.

In the manufacture of hose it is often desired to form the ends of a length of hose as a fitting adapted for receiving some cooperating connection into which it is inserted or which is inserted therein when the hose is subsequently installed as part of some conduit system. In the type of hose which is made by mounting a thin-walled rubber or rubberized sleeve over a mandrel and then covering the sleeve with various structural layers to build up a hose body thereon, the ends of the sleeve may be left uncovered and protruding from the structural overlay to serve as a fitting end. Such a thin-walled fitting, however, does not usually have sufficient stiffness to stand up against the pressure brought to bear against it by the cooperating fitting when an attempt is made to connect the two. Consequently, the thin-walled fitting tends to collapse under this pressure and thereby prevent the establishment of a connection.

In order to thicken the walls of such a fitting and thus give it sufficient body, a pre-formed rubber bushing may be inserted into or mounted over the end of the sleeve and secured thereto. This procedure, however, has certain disadvantages. First, it requires an additional member, the pre-formed bushing. Second, there is the problem of mounting the bushing in or on the thin-walled sleeve, which operation is itself subject to the same difficulty, the thin-walled sleeve tending to collapse instead of receive the pre-formed bushing.

Accordingly, it is an object of the present invention broadly to solve one or more of the aforesaid problems. In particular, it is an object of this invention to provide a method of forming a thick-walled fitting end from the thin-walled sleeve of a hose, thus avoiding the necessity of procuring a separate bushing and mounting it thereon. An additional object is to provide a fitting end which is vulcanized to the outer covering of the hose.

In accordance with an illustrative embodiment demonstrating objects, features, and advantages of article aspects of the present invention, there is provided a hose comprising a sleeve, the extremity of the sleeve being arranged in superposed plies and the plies being secured together to form a thick-walled fitting end on the hose.

In accordance with an illustrative method demonstrating objects, features, and advantages of method aspects of the present invention, there is provided a method of forming a thick-walled fitting end on a hose having a sleeve comprising the steps of folding the sleeve back over itself to build up its thickness at the extremity thereof until the required rigidity is achieved, and securing the superposed plies together to form the fitting.

The preceding brief summary, as well as further objects, features, and advantages of the present invention, may best be appreciated by reference to the following detailed description, when taken in conjunction with the accompanying drawings wherein:

FIG. 1 is a side elevational view, with parts broken away and sectioned, of a hose assembly at an intermediate stage of manufacture and just prior to the employment thereon of a hose manufacturing method in accordance with the present invention;

FIG. 2 is a side elevational view, with parts broken away and sectioned, of the hose assembly of FIG. 1 at a further intermediate stage of manufacture after a first cuffing step in accordance with method aspects of the present invention has been performed thereon;

FIG. 3 is a side elevational view, with parts broken away and sectioned, of the hose assembly of FIGS. 1 and 2 at a still further intermediate stage of manufacture after a second cuffing operation in accordance with method aspects of the present invention has been performed thereon;

FIG. 4 is a side elevational view, with parts broken away and sectioned, of the hose assembly of FIGS. 1–3 at a last intermediate stage of manufacture after a hunter clamp has been mounted thereon as a trimming guide and a blade has been brought into trimming position relative thereto; and FIG. 5 is a side elevational view, with parts broken away and sectioned, of a completed hose assembly in accordance with article aspects of the present invention.

Referring now specifically to the drawings, FIG. 1 illustrates a hose assembly at an intermediate stage of manufacture. In manufacturing flexible corrugated hose it is conventional to provide the hose with flexible, vulcanizable inner and outer sleeve members of elastomeric material (i.e. rubber), with a helical spring reinforcing member sandwiched therebetween to give radial strength to the hose. The spring is usually axially tensed and then secured to the inner sleeve to hold the latter in a corrugated condition and thereby provide the hose with a wide latitude of flexibility owing to the separability and compressibility of the coils relative to each other. In a typical embodiment, such a hose includes a thin-walled vulcanizable inner sleeve 12 which may consist of natural or synthetic rubber or of a fabric impregnated therewith, a helical spring 14 mounted over the sleeve 12, and an outer covering 16, preferably consisting of stockinet or another vulcanizable material, surmounting the spring 14. In the manufacture of hose of this type, a hose assembly at the intermediate stage of manufacture illustrated in FIG. 1 may be built up by slipping the sleeve 12 over a rod or mandrel 18, simultaneously blowing air into the inside of the sleeve 12 to expand it slightly and thus facilitate the insertion of the mandrel 18. The helical spring 14 is then slipped over the sleeve 12, stretched longitudinally, and taped thereto. The outer covering 16 is then mounted over the spring 14. The fitting end is then formed on the hose, preferably by the novel method hereinafter described, and then the hose assembly is vulcanized to secure the inner sleeve 12 to the outer covering 16 between the coils of the stretched helical spring 14.

In order to form a fitting end on the hose in accordance with the present invention, care is taken to leave a relatively long uncovered end section 20 of the sleeve 12 protruding from underneath the spring 14 and covering 16 at the ends of the hose assembly 10, as illustrated in FIG. 1. A novel method of building the end section 20 into a thick-walled fitting at each end of the hose assembly 10 will now be described in connection with the sequence of views of FIGS. 1–4 which illustrate successive stages of manufacture after successive operations in accordance with method aspects of the present invention, only one of the hose ends being illustrated, however, since the two are in all respects identical.

Starting with the hose assembly in the condition illustrated in FIG. 1, a cement, preferably of a vulcanizable type such as rubber cement, is applied to the protruding end section 20. Then the outer extremity 20a thereof is folded back over an adjacent portion 20b of the end section 20 to form a two-ply cuffed end 20a, b having the confronting surfaces thereof cemented together, as illustrated in FIG. 2.

If this does not provide a great enough thickness, the vulcanizable cement is applied to the outward facing surface of the outer ply 20a and the outer extremity 20a, b' of the two-ply cuffed end 20a, b is folded back over an adjacent portion 20a, b" thereof to form a four-ply cuffed end 20c having the confronting surfaces thereof cemented together as illustrated in FIG. 3. This process is repeated until the desired thickness is achieved. Each time an extremity is folded over, it is turned far enough back to overlap the edge 16a of the outer covering 16.

When the process of folding back has been completed and the entire hose assembly 10 is vulcanized in the well-known manner to secure the inner sleeve 12 and outer covering 16 together, the plies of the cuffed end and the layers of vulcanizable cement therebetween are unitized by the vulcanizing operation and the cuffed end is vulcanized to the edge of the outer coating 16. The vulcanized cuffed end 20c is then surmounted by a hunter clamp 22 or other device having a straight edge suitable for use as a trimming guide, and a blade 24 is used to trim the vulcanized cuffed end 20c along the edge of the hunter clamp 22, as seen in FIG. 4. This completes the manufacture of the hose and the thick-walled fitting end thereof, and the finished product may then be removed from the mandrel 18.

The resulting completed hose assembly 10, seen in FIG. 5, comprises, in accordance with article aspects of the present invention, a vulcanizable inner sleeve 12 and a vulcanizable outer covering 16, the extremity of the sleeve 12 being arranged in superposed plies overlapping the edge 16a of the outer covering 16 and being vulcanized together and to the outer covering 16 to form a thick-walled, one-piece fitting end 20c on the completed hose assembly 10 which is integral with the sleeve 12 and vulcanized to the outer covering 16 thereof, and which has a squared tip 20d at its extremity.

It will now be appreciated that the present invention provides a hose with a thick-walled fitting having sufficient rigidity to facilitate connection thereto, and which does not require a separate bushing. Advantageously, the fitting is securely vulcanized to the edge of the outer covering of the hose, thus contributing to its durability.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. The method of forming a thick-walled fitting end on a hose assembly having a vulcanizable outer covering and a vulcanizable inner sleeve having an end section which protrudes from said outer covering comprising the steps of repeatedly applying a vulcanizable cement to said end section and after each such application folding the extremity of said end section back over and in contact with an adjacent portion of said end section and overlapping the edge of said outer covering to form a cuffed end, after the last folding operation vulcanizing said cuffed end to unitize the plies thereof and to secure said cuffed end to said outer covering, and trimming said cuffed end to form a squared-off tip thereon.

2. The method of forming a thick-walled fitting end on a hose assembly having a vulcanizable outer covering and a vulcanizable inner sleeve having an end section which protrudes from said outer covering comprising the steps of applying a vulcanizable cement to said end section and folding the extremity of said end section back over and in contact with an adjacent portion of said end section and overlapping the edge of said outer covering to form a two-ply cuffed end, then applying a vulcanizable cement to said two-ply cuffed end and folding the extremity of said two-ply cuffed end back over and in contact with an adjacent portion of said two-ply cuffed end and overlapping the edge of said outer covering to form a four-ply cuffed end, vulcanizing said four-ply cuffed end to unitize the plies thereof and to secure said four-ply cuffed end to said outer covering, and trimming said four-ply cuffed end to form a squared-off tip thereon.

3. In a hose assembly of the type including an inner sleeve of an elastomeric material, a helical spring on said inner sleeve and secured thereto under axial tension, and an outer sleeve covering said spring and terminating short of the ends of said inner sleeve such that opposite end sections of said inner sleeve project beyond said outer covering, the improvement comprising integral thick-walled fittings on the opposite ends of said hose assembly and each including at least four superposed plies of said end sections, at least one of said plies overlapping the adjacent end of said outer covering, said superposed plies being vulcanized to each other to form said integral fittings and having said adjacent ends of said outer cover embedded therein.

4. A hose assembly comprising an inner sleeve of an elastomeric material, a helical spring on said inner sleeve and secured thereto under axial tension to corrugate a body portion of said hose assembly, an outer sleeve covering said spring and terminating short of the ends of said inner sleeve such that opposite end sections of said inner sleeve project beyond said outer covering, and integral thick-walled fittings on the opposite ends of said hose assembly and each including folded back superposed plies of said end sections overlapping the adjacent ends of said outer covering, said superposed plies being vulcanized to each other to form said integral fittings and having said adjacent ends of said outer cover embedded therein.

5. A hose assembly according to claim 4 wherein each of said integral fittings has an outer diameter at least equal to the outer diameter of said body portion.

6. A method of forming a fitting on a base assembly having a vulcanizable outer covering, a vulcanizable inner sleeve having an end section which protrudes beyond said outer covering and a helical spring sandwiched between said end inner sleeve and said outer covering comprising the steps of applying a vulcanizable cement to said end section, folding the extremity of said end section back over and in contact with an adjacent portion of said end section bonding said extremity to said adjacent portion with a part of said extremity overlapping and bonding to an edge portion of said outer covering for locking said spring in position inwardly of a cuffed end, vulcanizing said cuffed end, and then trimming said cuffed end to form a squared-off tip.

References Cited in the file of this patent

UNITED STATES PATENTS

| | | |
|---|---|---|
| 99,018 | Smith | Jan. 18, 1870 |
| 1,402,492 | Grote | Jan. 3, 1922 |
| 2,011,525 | Parsley | Aug. 13, 1935 |
| 2,115,254 | Van Cleef | Apr. 26, 1938 |
| 2,584,501 | Roberts | Feb. 5, 1952 |
| 2,898,941 | Kilcup | Aug. 11, 1959 |